United States Patent [19]

Kishida et al.

[11] Patent Number: 4,562,216
[45] Date of Patent: Dec. 31, 1985

[54] FLAME RETARDANT POLYESTER RESIN COMPOSITIONS

[75] Inventors: Kazuo Kishida; Isao Sasaki; Hiroshi Mori, all of Hiroshima, Japan

[73] Assignee: Mitsubishi Rayon Co., Ltd., Tokyo, Japan

[21] Appl. No.: 568,531

[22] Filed: Jan. 5, 1984

Related U.S. Application Data

[63] Continuation of Ser. No. 400,250, Jun. 17, 1982, abandoned.

[30] Foreign Application Priority Data

Jul. 31, 1981 [JP] Japan .............................. 56-121201

[51] Int. Cl.$^4$ ............................................ C08L 67/02
[52] U.S. Cl. ................................ 523/433; 523/427; 523/435; 523/444; 523/460; 524/373; 524/375; 524/605; 525/438
[58] Field of Search .............. 523/435, 460, 444, 427, 523/433; 525/438; 524/373, 375; 260/DIG. 24

[56] References Cited

U.S. PATENT DOCUMENTS

| | | | |
|---|---|---|---|
| 3,560,605 | 2/1971 | Siggel | 525/438 |
| 3,833,535 | 9/1974 | Wambach | 260/DIG. 24 |
| 3,873,491 | 3/1975 | Gall | 260/DIG. 24 |
| 3,909,485 | 9/1975 | Hongo | 523/460 |
| 3,947,421 | 3/1976 | Seydl | 260/DIG. 24 |
| 3,963,669 | 6/1976 | Wurmb | 260/DIG. 24 |
| 3,965,212 | 6/1976 | Kamada | 523/460 |
| 3,971,763 | 7/1976 | Anderson | 260/DIG. 24 |
| 4,010,219 | 3/1977 | Aoyama | 525/438 |
| 4,020,122 | 4/1977 | Borman | 525/438 |
| 4,035,333 | 7/1977 | Kamada | 525/438 |
| 4,070,332 | 1/1978 | Morikawa | 260/DIG. 24 |
| 4,221,893 | 9/1980 | Behar | 525/438 |
| 4,222,928 | 9/1980 | Kawamura | 525/438 |
| 4,271,274 | 6/1981 | Schmidt | 525/438 |

*Primary Examiner*—John C. Bleutge
*Assistant Examiner*—Patricia Short
*Attorney, Agent, or Firm*—Cushman, Darby & Cushman

[57] ABSTRACT

Flame retardant reinforced with thermoplastic polyester resin compositions are disclosed glass fiber and a system of flame retardants represented by the following general formulas (I) and (II), together with antimony trioxide. The flame retardant system is a blend of 1-20 parts by weight of component (I), and 2-40 parts by weight of component (II), provided the weight ratio (I)/(II) of the flame retardant components (I) to (II) is in the range of $0<(I)/(II)\leq 5$, and that the total amount of flame retardants (I) plus (II) is in the range of 3-40 parts by weight. From 2 to 3 parts by weight of antimony trioxide is present and 5 to 60% by weight of glass fiber is also present, these two percentages being expressed on the basis of the weight of the total resin composition. The resin compositions exhibit outstanding mechanical, thermal, forming and machining properties in addition to being fire retardant.

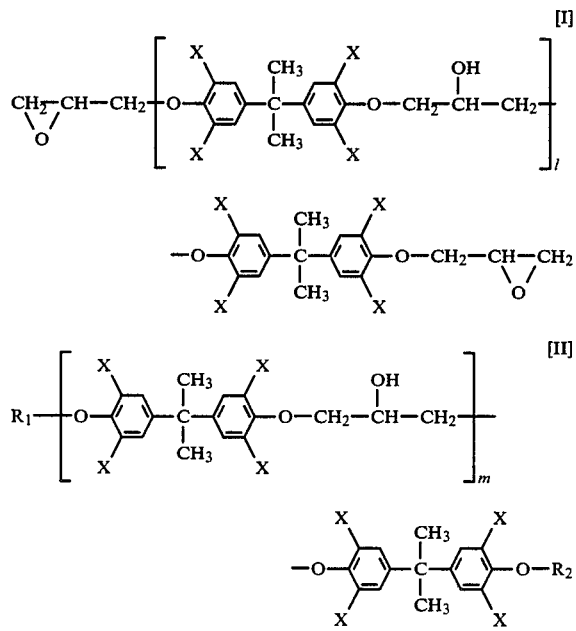

in which X is hydrogen, chlorine or bromine, the average value for l and m are independently 0 to 11 and the halogen content is 10% or more by weight. Values for $R_1$ and $R_2$ are given in the attached specification.

8 Claims, No Drawings

FLAME RETARDANT POLYESTER RESIN COMPOSITIONS

This is a continuation of application Ser. No. 400,250, filed June 17, 1982, now abandoned.

BACKGROUND OF THE INVENTION

1. Field of the Invention

This invention relates to flame retardant polyester resin compositions reinforced with glass fiber having outstanding mechanical and thermal properties as well as good forming and machining propeties.

2. Description of the Prior Art

Glass fiber reinforced products produced with polyester resin, such as polyethylene terephthalate and polybutylene terephthalate resins, have been used in numerous applications as a type of engineering plastic. Such reinforced resins are known for their outstanding physical properties, for example for their mechanical, thermal, and chemical resistance and for their forming and machining properties. On the other hand the glass fiber reinforced polyester resin has the distinct disadvantage of flammability, as do other synthetic resins. Accordingly flame retardancy is an important property for engineering plastics.

Normally untreated polyethylene terephthalate or polybutylene terephthalate resin products reinforced with glass fibers require a comparatively high molding temperature, for example in the range of about 240° to 300° C. This means that in order to be considered for incorporation into a polyester resin/glass fiber composition, a candidate flame retardant must itself exhibit good heat resistivity. This means one must use flame retardants that will only be degraded, if at all, at the high molding temperatures. Further, they must not impart color to nor deteriorate the resin properties in the ultimately molded products. Since polyethylene terephthalate resin/glass fiber reinforced products themselves have a high heat distortion temperature, they are typically used in comprehensive applications exposed to high temperatures, for example in electric appliances and the like. Consequently, the successful flame retardation of polyester resin/glass fiber reinforced products, as mentioned above, requires the molded articles to be thermally stable. That is, they should be free from deterioration in their flame retardant properties due to heat dissipation if the finished products are exposed to high temperatures over long term operations while still providing the required basic properties which include flame retardance, mechanical strength, heat resistance and the like.

Considering the above performance requirements, commonly assigned to U.S. Pat. No. 3,965,212, issued on June 22, 1976 describes flame retardant resin compositions which contain the flame retardant represented by general formula (I), described below, together with antimony trioxide in a particular relationship, combined together in a glass fiber reinforced polyethylene terephthalate resin composition. However, further investigations have revealed that the above-mentioned resin compositions may suffer from a deterioration in forming properties depending upon the molding conditions used. As examples this may occur in the case of increased temperature in the course of the extrusion or injection process, or a prolonged residence time in the mold. This is particularly true in the system where a flame retardant represented by the general formula (I) is much contained; fluidity deterioration is substantial. As a result restrictions are imposed on the molding machine type, molding conditions, injection volume, etc.

Glass fiber reinforced polybutylene terephthalate resin to which has been added the same flame retardant and antimony trioxide in general provides outstanding flame retardancy, acceptable mechanical properties, forming and machining properties and the like. However, in a system where the flame retardant represented by the general formula (I) is much contained a considerable drop in the heat distortion temperature occurs, causing the problem of heat resistance. It is to this problem that the present invention is directed.

SUMMARY OF THE INVENTION

Our continued investigations into ways for improving the above-mentioned disadvantages have led us to the present invention, by discovering the fact that a flame retardant polyester resin composition, exhibiting outstanding forming and machining properties, can be produced by adding a given amount of a flame retardant composition or system composed of three distinct types of flame retardant components, each having specific structures, to the polyester resin-containing glass fiber mixture, together with a given amount of antimony trioxide. Such a flame retardant system does not damage the various mechanical and thermal properties of the resulting composition; indeed adding a given amount of various inorganic materials to this composition further improves the resin composition's flame retardancy.

One embodiment of the present invention resides in a flame retardant polyester resin composition that is composed of a thermoplastic polyester resin, glass fiber, and a three-part flame retardant system or composition represented by the below-displayed general formulas (I) and (II), together with antimony trioxide, where the flame retardant system is a blend of about 1 to 20 parts by weight of a compound represented by formula (I) together with about 2 to 40 parts by weight, respectively, of at least one compound of formula (II) per 100 parts by weight of the thermoplastic polyester resin. The flame retardant system is composed such that the weight ratio (I)/(II) of the said flame retardants (I) to (II), is in the range of $0 < (I)/(II) \leq 5$ and that the total amount of the said flame retardants (I) and (II) is in the range of 3–40 parts by weight, in addition to antimony trioxide present in an amount of 2–30 parts by weight per 100 parts by weight of thermoplastic polyester resin. Glass fiber is also present in the composition in an amount of about 5 to about 60% by weight of the total resin composition volume.

According to another embodiment of our invention the flame retardant polyester resin composition additionally contains at least one inorganic compound in an amount of about 1 to about 40% by weight, provided that the total amount of the glass fiber plus inorganic compound is no more than 60% by weight of the composition.

Compound I has the following general formula:

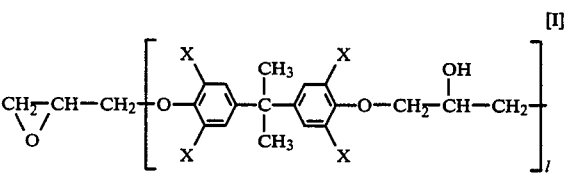

-continued

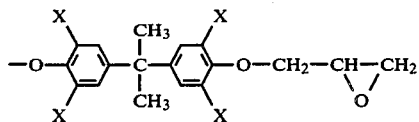

in which X is hydrogen, chlorine or bromine and l is an average value of 0–11. The halogen content is at least 10% by weight.

The second component of the flame retardant system II has the following formula:

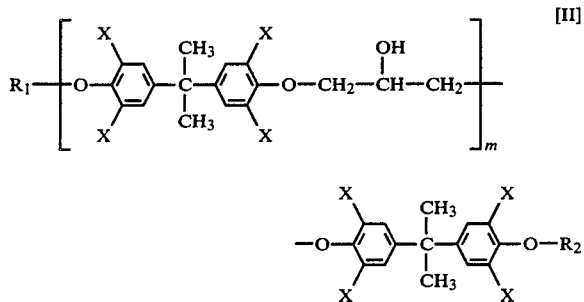

in which X is hydrogen, chlorine or bromine and m has an average value of 0–11. As with II the halogen content is at least 10% by weight of the component. $R_1$ and $R_2$ may be the same or different, and both have the definition (1), (2) or (3), given below, or one of them has the definition (1), (2) or (3) given below, and the other is a glycidyl group:

(1) the reaction product of the terminal glycidyl group of the compound represented by general formula (I) with an alcohol, halogenated alcohol, amine, halogenated amine, organic carboxylic acid or halogenated organic carboxylic acid;

(2) a hydrocarbon containing up to 30 carbon atoms or a halogenated hydrocarbon also containing up to 30 carbon atoms; or (3) an ester residual group —$COR_3$ in which $R_3$ represents a hydrocarbon containing up to 30 carbon atoms or a halogenated hydrocarbon also containing up to 30 carbon atoms.

The compounds represented by formula (I) are described in more detail in U.S. Pat. No. 3,965,212, the disclosure of which is incorporated herein by reference.

The present invention also includes a process for producing a resin composition which provides the mechanical properties and flame retardancy to the same extent as in the case of resin compositions using only the flame retardant represented by the general formula (I). By combining into one system the flame retardants represented by the above-mentioned general formulas (I) and (II), all present in the indicated amounts, flame retardancy is substantially improved in addition to the excellent and well-balanced heat resistance and forming/machining properties. Another feature of our invention is the fact that the addition of an inorganic compound in a predetermined volume contributes to the improvement in flame retardancy of the resulting composition, particularly in the so-called drip-preventing effect during the course of combustion.

DETAILED DESCRIPTION OF THE INVENTION

Thermoplastic polyester resins used in accordance with the present invention include a linear polyester composed of ethylene terephthalate units or butylene terephthalate units, as well as linear copolyesters consisting of small amounts of copolymerized polyhydric alcohols, aromatic dicarboxylic acids, aliphatic dicarboxylic acid, and the like mixtures of other thermoplastic resins composed mainly of these polyesters or copolyesters. It is ordinarily preferred that the intrinsic viscosity [$\eta$] of the above-mentioned linear polyester or linear copolyester resin component be in the range of from 0.4 to 1.5 measured at 25° C. in a 50/50 (weight ratio) mixed solvent of tetrachloroethane and phenol.

There are no particular restrictions on the type of glass fibers used in this invention, both the roving type and chopped strand type are quite satisfactory. For productivity considerations the chopped strand is preferred. From the viewpont of operability in the mixing process, as well as frictional wear of the molding machine and breakage of glass fiber during the course of the formation process, we prefer a glass fiber product about 0.4 to about 6 mm in length, and most preferably the glass fiber will have a length of about 0.2 to about 2.0 mm. Commercially available glass fibers, which may have been given various treatments, are conveniently used as is. The amount of glass fiber included is about 5 to about 60% by weight of the total resin composition which is composed of thermoplastic polyester resin, glass fiber, flame retardant and antimony trioxide. Addition of glass fiber in an amount less than 5% by weight provides little reinforcement effect while an amount exceeding 60% by weight is not desirable since it contributes to deterioration of the forming/machining properties and from the view point of the fluid machinability.

The flame retardant system used in the present invention is normally represented by the general formulas (I) and (II) as described in detail above. One of the most important factors is that l and m, which represent the average degree of polymerization of the respective flame retardants should be up to 11. Blends having more than this level of polymerization are not desirable since it contributes to deterioration of the resin properties because it interferes with uniform dispersion of the flame retardant into the resin composition. If the halogen content in each of these flame retardants fails to reach 10% by weight, an excessively small blending amount of the flame retardant makes it difficult to attain sufficient flame retardancy while an excessively high blending amount lowers the resin properties, leading to an undesirable lowered drip-resistance.

Specific examples of the flame retardants represented by general formula (II) are as follows:

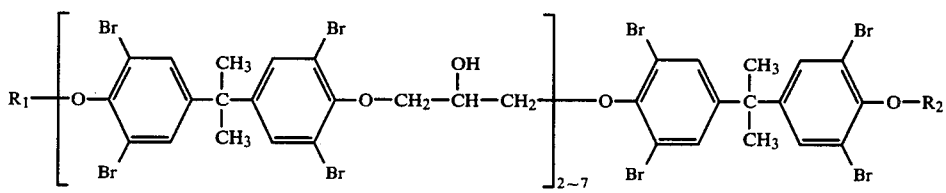

which for convenience may be abbreviated to R₁—Z—R₂. The R₁ and R₂ substituents may independently be represented by one of the following compounds:

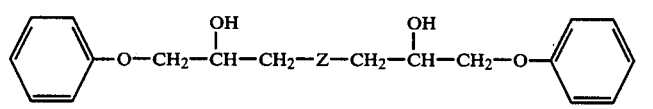
(1)

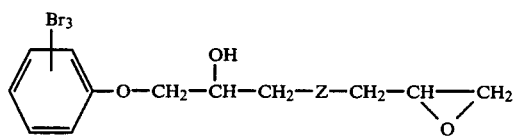
(2)

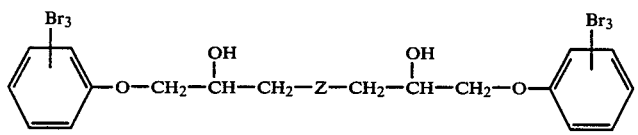
(3)

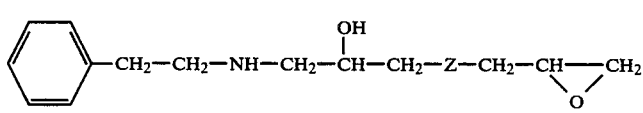
(4)

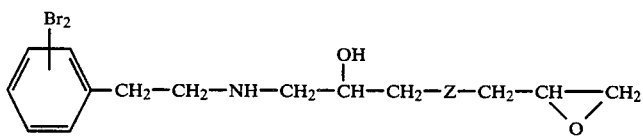
(5)

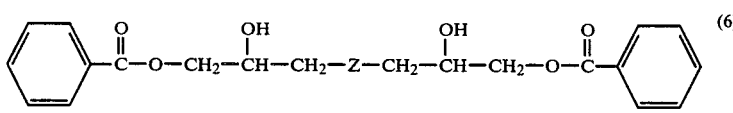
(6)

CH₃CH₂—Z—CH₂CH₃ (7)

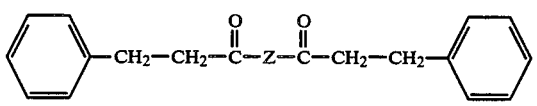
(8)

According to the present invention, the amounts of the individual flame retardant components blended into the flame retardant system as represented by the general formulas (I) and (II), are as follows:

per 100 parts by weight of thermoplastic polyester resin
1–20 parts by weight: a flame retardant represented by formula (I)
2–40 parts by weight: a flame retardant represented by formula (II)

with the proviso that the flame retardant weight ratio of (I)/(II) is in the range of $0 < (I)/(II) \leq 5$ and further that the total of flame retardants (I) plus (II) is within the range of about 3 to about 40 parts by weight.

The weight ratio and overall total of components (I) and (II) are interrelated. As an example in the case where the total of flame retardants (I) and (II) is comparatively large but still within the specified total, it is desirable to adjust the ratio of (I)/(II) upwardly towards a value of 3.

Subsequently, it is necessary that antimony trioxide, which is used together with the above-mentioned flame retardant components, should be present in the range of about 2 to about 30 parts by weight calculated on the basis of 100 parts by weight of thermoplastic polyester resin; preferably the amount of antimony trioxide used is within the range of about 3 to about 20 parts by weight. The antimony trioxide blend present in an amount exceeding 20 parts by weight is not desirable since it deteriorates the mechanical strength of the resin composition. The quantity of the antimony trioxide component of the composition is adjusted in accordance with the overall volume of the other two components of the 3 components flame retardant system. In the case when the above-mentioned flame retardant volume is comparatively low, it is recommended to increase the antimony trioxide volume within the range of this invention, or, in the case when the above-mentioned flame retardant volume is comparatively high, it is recommended to decrease the antimony trioxide volume within the range of this invention.

In the present invention, it is possible to enhance the drip-resistance and flame retardance by blending at least one inorganic compound into the above-disclosed flame retardant polyester resin composition. While there is no particular restriction on the inorganic compound, so long as the inorganic compound is operative, we recommend silicic acid or a silicate, including talc, kaolin, wollastonite, silica, mica, diatomaceous earth, ground quartz, clay, white carbon and the like. Of these specifically mentioned compounds, talc is effective in improving the forming and machining properties while white carbon is particularly recommended because of its outstanding improvement in the drip-resistance of the compositions. It is possible to include these inorganic compounds either alone or in combination of two or more types, within the range of about 1 to about 40% by weight of the total resin composition. Only a slight improvement can be expected in drip-resistance if the inorganic compound added is less than 1% by weight. It is also necessary that the blending is carried out so that the total of the glass fiber plus inorganic compound contains no more than 60% by weight of the total resin composition.

Preparation of the fire retardant glass fiber reinforced polyester resins of the present invention is carried out, for example, by mixing together well dried chips or particles of the thermoplastic polyester resin, together with glass fiber, the required flame retardants represented by the general formulas (I) and (II), antimony trioxide and optionally an inorganic compound, all present within the above-stated quantities, and uniformly blending these components together in a V-blender. The blend is then melted extruded or processed according to conventional procedures. Alternatively the polymer, flame retardant, antimony trioxide and inorganic compound are first melted and mixed together to form a blend and then added with the glass fiber to the resin particles.

The compositions of the invention can comprise, consist essentially or consist of the materials set forth and the process or method can comprise, consist essentially of or consist of the steps set forth with such materials.

The resin compositions of the present invention may also include conventional additives and modifiers as are used in the art. These include light stabilizers, particularly U.V. stabilizers, heat stabilizers, dyestuffs, pigments, crystal nucleating agents and other conventional additives.

The present invention will be further described in the following examples. Unless otherwise indicated, all parts and percentages are by weight and all temperatures are reported in degrees centigrade.

EXAMPLES 1 THROUGH 8 AND COMPARATIVE EXAMPLES 1 THROUGH 3

Sodium benzoate, glass fiber chopped strand 3 mm length' the flame retardant components, antimony trioxide and an inorganic compound are added to well dried polyethylene terephthalate (abbreviated as PET) and polybutylene terephthalate (abbreviated as PBT) resins whose intrinsic viscosity is 0.72 when measured at 25° C. in a 50/50 (weight ratio) mixed solvent of tetrachloroethane and phenol. The amounts that were added are shown in Table 1, and then uniformly blended for five minutes in a V-blender.

The blend as prepared above is extruded by means of 40 mm$\phi$ vented extruder at the cylinder temperature of 260°–280° C. to form pellets. These pellets are then injection molded in a screw type injection molding machine (36 mm$\phi$, 5 ozs.) at a cylinder temperature is 280° C. and mold temperature, 80° C., and formed into test pieces 3.2 mm and 6.4 mm thick for flexural strength testing and heat distortion testing, respectively, and pieces 1.5 mm thick for burning tests.

The mechanical properties, thermal properties and flame retardancy were all evaluated using the test pieces as described above.

Processing characteristics of the flame retardant polyester compositions were evaluated with the injection molding cycle 120 seconds in the short shot condition where the molding cycle is longer than the ordinary molding cycle 60 seconds. That is, taking the initial injection pressure be the total of short shot plus 150 kg/cm$^2$, the evaluation was made in terms of the number of shots until the short shot is attained at this pressure, with the melting viscosity increasing during the course of the molding process.

Table 1 reports the results of this evaluation and series of tests. Table 1 also indicates the flexural strength on the basis of ASTM D-638 and heat distortion temperature using ASTM D-648 (load: 264 psi). Flame retardancy measurements were made on the basis of the flammability test of Underwriters' Laboratories, Inc. (UL-94) in which the flammability tests were repeated 10 times using five samples 127 mm × 12.7 mm × 1.5 mm.

The followng formulas represent the types (A), (B) and (C) of the flame retardants shown in Table 1:

Retardant (A):

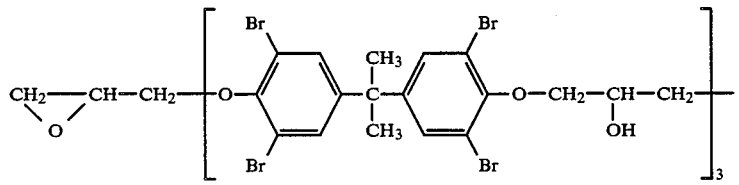

-continued

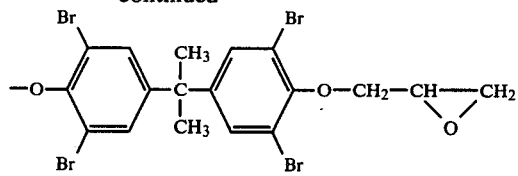

Retardant (B):

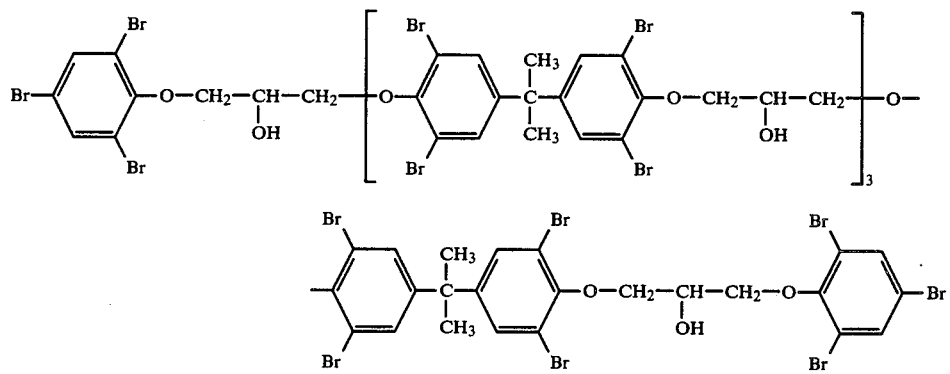

Retardant (C):

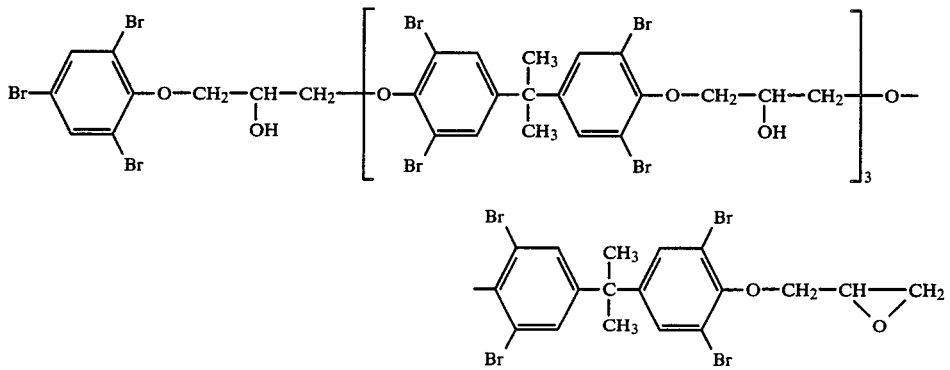

As shown in Table 1, it is important in polyethylene terephthalate resin series, from machining properties viewpoint, that the flame retardants represented by general formulas (I) and (II) are blended together in specific proportions. This data also demonstrates that inorganic compound blending tends to improve drip resistance in the flame retardance. In contrast, polybutylene terephthalate series it is important, from heat resistance viewpoint, that the flame retardants represented by general formulas (I) and (II) specified by the present invention are blended together within the specific ranges and proportions as defined above.

TABLE 1

| | | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| Composition | | | | | | | | | | | | |
| Polymer | Type | PET | PET | PET | PET | PET | PET | PET | PBT | PET | PET | PBT |
| | Part by weight | 100 | 100 | 100 | 100 | 100 | 100 | 100 | 100 | 100 | 100 | 100 |
| Glass fiber | Part by weight | 57 | 57 | 48 | 55 | 60 | 66 | 59 | 57 | 58 | 57 | 58 |
| Sodium benzoate | Part by weight | 0.2 | 0.2 | 0.2 | 0.2 | 0.2 | 0.2 | 0.2 | 0 | 0.2 | 0.2 | 0 |
| Flame retardant | Type | (A)/(B) | (A)/(C) | (A)/(C) | (A)/(B) | (A)/(B) | (A)/(B) | (A)/(B) | (A)/(B) | (A) | (A)/(C) | (A) |
| | Part by weight | 12/12 | 12/12 | 3/2 | 15/4 | 3/27 | 12/12 | 12/12 | 12/12 | 25 | 20/2 | 25 |
| Antimony trioxide | Part by weight | 10 | 10 | 8 | 10 | 10 | 10 | 10 | 10 | 10 | 10 | 10 |
| Inorganic compound | Type | — | — | — | — | — | talc | white carbon | — | — | — | — |
| | Part by weight | — | — | — | — | — | 20 | 4 | — | — | — | — |

TABLE 1-continued

|  |  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|---|
| Processing characteristics |  |  |  |  |  |  |  |  |  |  |  |  |
| Molding cycle | Second | 120 | 120 | 120 | 120 | 120 | 120 | 120 | 60 | 120 | 120 | 60 |
| Melting viscosity variation | Number of shots | Nil | Nil | Nil | Nil | Nil | Nil | Nil | Nil | 4 | 8 | Nil |
| Flexural strength | kg/cm' | 1840 | 1890 | 1980 | 1970 | 1810 | 1830 | 1790 | 1860 | — | — | 1880 |
| Heat distortion temperature | °C. | 227 | 225 | 239 | 228 | 223 | 229 | 227 | 207 | — | — | 193 |
| Flame retardance |  |  |  |  |  |  |  |  |  |  |  |  |
| Drip frequency | Times | 5 | 6 | 9 | 7 | 5 | 3 | 1 | 4 | — | — | 4 |
| Cotton inflammation frequency | Times | 0 | 0 | 0 | 0 | 0 | 0 | 0 | 0 | — | — | 0 |
| Average combustion time | Second | 2.6 | 2.9 | 3.7 | 2.9 | 2.3 | 1.9 | 1.7 | 2.8 | — | — | 2.4 |
| Conclusion |  | V-O | V-O | V-O | V-O | V-O | V-O | V-O | V-O | — | — | V-O |

What is claimed is:

1. A flame retardant glass fiber reinforced polyester resin composition comprising:
   A. 100 parts by weight of a thermoplastic linear polyester composed of ethylene terephthalate units;
   B. from about 1 to about 20 parts by weight of a first flame retardant component of the formula (I);
   C. from about 2 to about 40 parts by weight of a second flame retardant component of the formula (II);
      provided that the first and second fire retardant components are blended together so that the weight ratio of (I)/(II) is in the range of $0 < (I)/(II) \leq 5$, and further that the total of the first and second flame retardant components (I) and (II) is from about 3 to about 40 parts by weight;
   D. from about 2 to about 30 parts by weight of antimony trioxide, and
   E. from about 5 to about 60 percent by weight of glass fiber based upon the total amount of the resin composition, the first flame retardant component is represented by the formula (I):

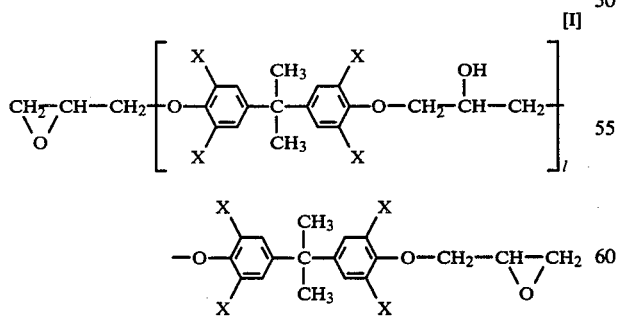

in which X represents hydrogen, chlorine or bromine and $l$ has an average value from 0 to 11 and the halogen content is at least 10% by weight; and the second flame retardant component is represented by the formula (II):

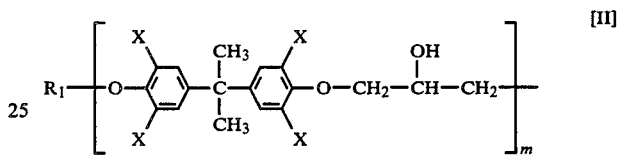

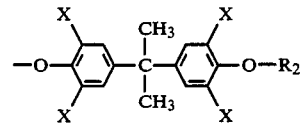

in which X represents hydrogen, chlorine or bromine and m has an average value from 0 to 11 and the halogen content is at least 10% by weight, and $R_1$ and $R_2$ are both independently (1) the reaction product of the terminal glycidyl group of a compound represented by formula (I) with a halogenated alcohol or when only one of $R_1$ or $R_2$ is (1) the other is a glycidyl group.

2. The flame retardant glass fiber reinforced polyester resin composition of claim 1 further including:
   F. from about 1 to about 40 percent by weight of an inorganic filler based upon the total amount of the resin composition.

3. The flame retardant glass fiber reinforced polyester resin composition of claim 1 or 2 in which the glass fiber is chopped strand-type glass fiber.

4. The flame retardant glass fiber reinforced polyester composition of claim 3 in which the fiber length of the glass fiber is about 0.4 to 6 mm.

5. The flame retardant glass fiber reinforced polyester resin composition of claim 1 or 2 in which the linear polyester has an intrinsic viscosity $[\eta]$ of about 0.4 to 1.5.

6. The flame retardant glass fiber reinforced polyester resin composition of claim 2 in which the inorganic compound is silicic acid, a silicate or mixtures thereof.

7. The flame retardant glass fiber reinforced polyester resin composition of claim 6 in which the inorganic compound is talc, kaolin, wollastonite, silica, mica, diatomaceous earth, ground quartz, clay, white carbon or mixtures thereof.

8. The flame retardant glass fiber reinforced polyester resin composition of claim 6 in which the inorganic compound is talc, white carbon or their mixture.

* * * * *